Patented Jan. 19, 1937

2,067,931

UNITED STATES PATENT OFFICE 2,067,931

COMPOSITION AND PROCESS FOR THE PRODUCTION OF FERTILIZERS

Walter H. Kniskern, Petersburg, Va., and Charles K. Lawrence, Baldwinsville, N. Y., assignors to Atmospheric Nitrogen Corporation, New York, N. Y., a corporation of New York No Drawing. Application December 9, 1933, Serial No. 701,724

12 Claims. (Cl. 71—43)

This invention relates to compositions containing ammonia and at least two nitrogenous fertilizer salts, one of which is ammonium nitrate; to processes for their preparation; to methods for the transportation of ammonia and said fertilizer salts in the form of said compositions; and to the use of these compositions in the production of fertilizers.

The methods for the fixation of atmospheric nitrogen which have gone into extensive commercial use make available large amounts of fixed nitrogen in the form of ammonia which are available for industrial purposes and particularly for the production of fertilizers. The ammonia may be industrially utilized as such or it may, if desired, be neutralized with acids, such as hydrochloric acid and nitric acid, to form the corresponding ammonium chloride and ammonium nitrate, both of which are valuable fertilizer ingredients. In the case of the nitric acid used for ammonium nitrate production, this too may be obtained from fixed nitrogen in the form of ammonia by oxidizing the ammonia and reacting the resulting nitrogen oxides with water. From this nitric acid sodium nitrate may be prepared by reaction with a sodium salt. It is also known to prepare sodium nitrate by direct absorption of nitrogen oxides in a solution of sodium carbonate or sodium hydroxide.

The production and marketing of ammonia, either as free ammonia or in combination in the form of ammonium salts, and of sodium nitrate is attended by difficulties and expensive operations. Liquid anhydrous ammonia itself has a relatively high vapor pressure at ordinary temperatures. Accordingly, in order to ship and handle the ammonia in this form, precautions must be taken to prevent losses of ammonia. If the ammonia is shipped in the form of aqua ammonia, a large proportion of the transportation costs go for the transportation of the valueless water. Again, if the ammonia is combined with acid to form the corresponding ammonium salt, such as ammonium chloride, or is oxidized and the nitrogen oxides are employed for the production of sodium nitrate, in order to recover the ammonium chloride or sodium nitrate as a solid salt from the solutions obtained in the processes for its production, large amounts of water must be evaporated from the solutions, which adds greatly to the cost of the material.

It is frequently desirable to prepare fertilizers containing nitrogen as well as $P_2O_5$ derived from materials such as superphosphate. It has been proposed to prepare such fertilizers by treating a superphosphate with ammonia. When ammonia is added to a superphosphate in relatively large amounts, however, the ammonia tends to cause water and citrate soluble $P_2O_5$ in the superphosphate, both of which are considered available as plant food, to revert to citrate insoluble $P_2O_5$, which is not considered available to plants. There is, therefore, a limit to the amount of nitrogen which may be added as free ammonia in treating a superphosphate with ammonia or other ammoniacal material. For certain purposes, however, it is desirable to have fertilizers containing more nitrogen than may be obtained by ammoniating superphosphate.

It is, accordingly, an object of this invention to provide a composition of matter which comprises an ammoniacal solution of two or more nitrogenous inorganic fertilizer salts, one of which is ammonium nitrate and which contains a relatively large proportion of total nitrogen to basic ammonia in the composition. It is a further object of this invention to provide methods for economical and ready transportation of fixed nitrogen in the form both of ammonia and of salts such as ammonium nitrate, ammonium chloride, or sodium nitrate. Another object of this invention is to provide a process for the production of fertilizers from solid acidic fertilizer materials, which fertilizers contain an increased proportion of nitrogen by treating, for example, a monocalcium acid phosphate material, such as superphosphate or triple superphosphate, or mixtures containing the same, with a liquid composition comprising ammonia, ammonium nitrate, and another nitrogenous fertilizer salt such as ammonia chloride or sodium nitrate.

While ammonium chloride is somewhat soluble in ammoniacal liquids, such as aqua ammonia, or anhydrous liquid ammonia, these solutions of ammonium chloride, when they contain relatively large proportions of the dissolved salt, exhibit a tendency to throw down a solid phase or even to entirely solidify at the lower atmospheric temperatures. This property of ammoniacal solutions of ammonium chloride makes it impossible to prepare such solutions containing a relatively high proportion of nitrogen combined as a salt to the nitrogen present as free ammonia which retain their fluid condition at temperatures commonly prevailing, particularly during the winter months.

We have discovered that compositions particularly adaptable to being transported and handled since they remain as a liquid even at relatively low temperatures and which are particularly suitable for use in the preparation of mixed fertilizers by addition to an acidic material such as superphosphate or triple superphosphate since they contain relatively high proportions of combined nitrogen to the nitrogen present as free ammonia, may be prepared by dissolving both ammonium chloride and ammonium nitrate in an ammoniacal liquid such as anhydrous liquid ammonia or aqua ammonia. In the following table there are shown the compositions of solutions in both anhydrous liquid ammonia and in aqua ammonia containing about 50% $NH_3$ and 50% $H_2O$, of ammonium chloride both with and without ammonium nitrate for various temperatures at which a solid phase might salt out from the solutions:

Table I

| Salting out temperature °C | Composition; percent by weight | | | | Ratio (by weight) N—combined in salts |
|---|---|---|---|---|---|
| | $NH_4Cl$ | $NH_4NO_3$ | $NH_3$ | $H_2O$ | N—in free $NH_3$ |
| 3.5 | 41.5 | | 58.5 | | 0.23 |
| 0 | 39.5 | | 60.5 | | 0.21 |
| 3.5 | 45.1 | 10.0 | 44.9 | | 0.42 |
| 0.5 | 35.5 | 18.3 | 46.2 | | 0.41 |
| 0 | 20.0 | 40.5 | 39.5 | | 0.60 |
| Below −19 | 5.0 | 66.7 | 28.3 | | 1.06 |
| 0 | 31.0 | | 34.5 | 34.5 | 0.29 |
| −2 | 28.4 | 10 | 32 | 31.6 | 0.39 |
| −5 | 5.0 | 56.1 | 19.4 | 19.5 | 1.30 |
| 2 | 16.0 | 30.0 | 27.0 | 27.0 | 0.66 |

As shown by the data in the above Table I, we have found that by dissolving ammonium nitrate in the ammonium chloride-ammonia solution, there is an actual increase in the solubility of the ammonium chloride in anhydrous ammonia at temperatures in the neighborhood of 0° C. so that more concentrated solutions which do not deposit a solid phase may be prepared by including ammonium nitrate than when no ammonium nitrate is present in the solution. We have found that for solutions of ammonium chloride in anhydrous liquid ammonia saturated at temperatures below about 11° C., the addition of ammonium nitrate in amount up to about 30% $NH_4NO_3$ in the composition increases the solubility of the ammonium chloride; i. e., the proportion of ammonium chloride to ammonia in solutions salting out at a given temperature.

While the ammonium nitrate acts to increase the solubility of ammonium chloride in liquid ammonia (a liquefied ammonia which may be anhydrous or contain a small proportion of water), as the proportion of water to ammonia is increased, the effect of the ammonium nitrate in increasing the solubility of the ammonium chloride decreases. Nevertheless, even for solutions in aqua ammonia, the addition of the ammonium nitrate has real practical advantages since as pointed out above and as shown in the data of the above table, it permits the production of solutions containing relatively high proportions of combined nitrogen (ammonium and nitrate nitrogen) to nitrogen in the form of basic ammonia and thus permits of the preparation of fertilizers containing relatively high proportions of nitrogen without the addition of sufficient ammonia to cause undue reversion of the $P_2O_5$ content of the superphosphate or triple superphosphate.

Similar advantages may be obtained from solutions of sodium nitrate and ammonium nitrate in both anhydrous liquid ammonia and in aqua ammonia. The following table shows the compositions of such solutions salting out at the indicated temperatures.

Table II

| Salting out temperature | Composition; percent by weight | | | | Ratio (by weight) N—combined in salts |
|---|---|---|---|---|---|
| | $NaNO_3$ | $NH_4NO_3$ | $NH_3$ | $H_2O$ | N—in free $NH_3$ |
| 0° C | 55.8 | | 44.2 | | 0.25 |
| 0° | 28.0 | 30.0 | 42.0 | | 0.44 |
| 0° | 10.0 | 53.0 | 37.0 | | 0.66 |
| −6° | 40.0 | 15.0 | 45.0 | | 0.32 |
| −17° | 5.0 | 70.0 | 25.0 | | 1.23 |
| 0° C | 36.0 | | 32 | 32 | 0.22 |
| −1° | 31.0 | 5.0 | 32 | 32 | 0.26 |
| 0° | 5.0 | 60.0 | 17.5 | 17.5 | 1.52 |

It may be seen from the data given in Table II that by employing both sodium nitrate and ammonium nitrate, solutions which do not salt out at temperatures above about 0° C. may be prepared containing relatively high proportions of nitrogen in combination as a salt to nitrogen present as free ammonia. Further, these solutions of sodium and ammonium nitrate are advantageous because of their relatively high content of nitrate-nitrogen to ammonia nitrogen, since ammonia nitrogen tends to make soils undesirably acid, whereas nitrate-nitrogen does not have this effect upon the soil.

The liquid compositions of this invention present numerous practical advantages from the viewpoint of the marketing of nitrogenous materials and the production of nitrogen-phosphorous fertilizers. By employing ammonium nitrate, it is possible in many cases to increase the amount of ammonium chloride which may be dissolved in a given quantity of anhydrous liquid ammonia and still obtain liquids which may be shipped and which will not present serious difficulties by the formation of solid materials from the solutions under the varying atmospheric temperatures to which they may be exposed. Solutions of ammonium chloride in concentrated ammoniacal liquids, such as liquid anhydrous ammonia or liquid ammonia containing relatively small proportions of water, which also contain a minor proportion of ammonium nitrate, for example, about 10% to 30% of ammonium nitrate and which are substantially saturated with solid components at temperatures below about 11° C. are of particular importance from the viewpoint of the relatively high proportion of ammonium chloride in the solutions. From the viewpoint of adding relatively large amounts of nitrogen to superphosphate materials without using sufficient basic ammonia to cause undue reversion of $P_2O_5$ and of transporting and utilizing the liquid compositions without material difficulties arising from a solid phase salting out, solutions of ammonium chloride or sodium nitrate and ammonium nitrate in ammoniacal liquids, either aqua ammonia, anhydrous liquid ammonia, or liquefied ammonia containing water, which are substantially saturated with solid components at temperatures between about −30° C. and 30° C., and particularly at about 0° C. are of especial value.

The presence of the ammonium chloride or sodium nitrate and ammonium nitrate lowers, to a marked degree, the vapor pressures of the solutions of this invention as compared with the vapor pressures of aqua or anhydrous liquid ammonia.

The following table shows the vapor pressures of anhydrous liquid ammonia and of a 50% aqua ammonia compared with the vapor pressures of certain of the solutions of this invention.

clogging the sprayer by the formation of solid material from the solution. The use of the liquid permits of a thorough dissemination of the ammonium nitrate, ammonium chloride, sodium

*Table III*

| Solution; per cent by weight | | | | | Vapor pressures (atmospheres gauge) | | | | | Salting out temp. |
|---|---|---|---|---|---|---|---|---|---|---|
| $NH_3$ | $NH_4Cl$ | $NaNO_3$ | $NH_4NO_3$ | $H_2O$ | 0° C. | 10° C. | 20° C. | 30° C. | 40° C. | |
| 100 | | | | | 3.24 | 5.07 | 7.46 | 10.51 | 14.31 | |
| 38.5 | 21.5 | | 40.0 | | 0.15 | 0.80 | 1.60 | 2.75 | 4.40 | 15° C. |
| 44.0 | | 26.0 | 30.0 | | 1.38 | 2.35 | 3.60 | 5.27 | 7.40 | −15° C. |
| 50 | | | | 50 | 0.16 | 0.72 | 1.55 | 2.60 | 4.00 | |
| 27 | 16.0 | | 30.0 | 27 | −0.65 | −0.47 | −0.16 | 0.28 | 0.92 | 2° C. |
| 26 | | 20.0 | 28.0 | 26 | −0.24 | 0.08 | 0.50 | 0.98 | 1.64 | 10° C. |

These solutions of ammonium nitrate and another fertilizer salt such as ammonium chloride or sodium nitrate, accordingly, provide a suitable form for the transportation of large quantities of nitrogen in a highly concentrated condition and simplify the precautions which must be taken to prevent loss of ammonia due to the high vapor pressure of anhydrous liquid ammonia. Thus, the liquid compositions may be transported, stored and handled in closed containers in which the liquid is under its own vapor pressure materially below the vapor pressure of the corresponding anhydrous liquid or aqua ammonia which does not contain dissolved in it the ammonium nitrate and other salt contained in the liquid compositions of this invention. In some cases the pressure in a container for these compositions may be atmospheric and the vapor pressure of the composition itself constitute but a portion of the total pressure within the container. Our invention, accordingly, comprises a transportable package comprising a closed container and within it a liquid composition described herein under its own vapor pressure, which constitutes either the whole or a part of the total pressure upon the liquid.

The methods suitable for the preparation of these solutions facilitate putting the ammonium chloride or sodium nitrate and ammonium nitrate into a form in which they may be moved to the market and provides liquid compositions which, at the usual atmospheric temperature conditions, do not throw down a precipitate of solid material, or if some precipitate should occur at extremely low temperatures, such as may be met with in the winter time, the precipitated solid may be redissolved by a slight warming of the solution.

The use of the compositions of this invention as a means for the transportation, storage, and handling of ammonium chloride, ammonium nitrate and sodium nitrate obviates the difficulties arising in the marketing of the solid salts because of the property these solid salts have of caking together when stored, which frequently necessitates disintegration of the caked mass before it may be utilized. The liquid ammonium chloride-ammonium nitrate-ammonia-containing compositions or sodium nitrate-ammonium nitrate-ammonia compositions, on the other hand, may be readily utilized in the production of fertilizer materials containing superphosphate, for example by mixing the liquid with the solid. This mixing may, if desired, be accomplished by spraying the liquid onto the solid material while it is being agitated in a mixing machine. The liquid compositions are suitable for spraying since they may be readily handled without their nitrate, and ammonia throughout the superphosphate material and the formation of substantially homogeneous fertilizer products having a satisfactory physical condition.

The anhydrous solutions of this invention may be conveniently prepared by treating the desired proportions of dry ammonium nitrate and ammonium chloride or sodium nitrate with gaseous or liquid anhydrous ammonia. In making aqueous solutions, solutions or slurries of ammonium nitrate and/or ammonium chloride and/or sodium nitrate in water may be treated with either aqua, gaseous, or liquid anhydrous ammonia, or if desired, solid, moist ammonium nitrate and ammonium chloride or sodium nitrate may be dissolved in the desired strength of anhydrous liquid or aqua ammonia. Solutions or slurries of ammonium nitrate and ammonium chloride or sodium nitrate having any desired degree of concentration may be treated with ammonia. Furthermore, this invention permits of producing ammonium chloride, sodium nitrate or of ammonium nitrate by absorbing ammonia in hydrochloric or nitric acid solutions or by neutralizing a sodium carbonate solution with nitric acid or nitrogen oxides, without necessitating a close control of the degree of neutralization of the solutions in order to obtain a non-acid product such as is required where the solid salts are to be shipped. Where the compositions of this invention are used for the transportation and marketing of the ammonium chloride, sodium nitrate and ammonium nitrate, the solutions in which the ammonia is absorbed may be operated with any desired degree of acidity or the sodium nitrate solution obtained by reacting sodium carbonate with nitric acid or nitrogen oxides may have any desired content of free acid, and the free acid in the mother liquors adhering to the solid salts is neutralized by the ammonia used in making up the ammoniacal solutions of this invention. If desired, a mixture of hydrochloric acid and nitric acid may be neutralized with ammonia to form a mixture of ammonium nitrate and ammonium chloride, which may be recovered in the form of the mixed solid salts from the solution in which they are formed and treated with ammonia to form the desired liquid composition or a slurry of ammonium nitrate and ammonium chloride may be directly formed in the neutralizing treatment of the acids and this slurry treated with ammonia. Again, the liquid compositions containing ammonium chloride-ammonium nitrate-ammonia, with or without water, may be prepared in a single operation by the reaction of hydrochloric and nitric acids with excess ammonia.

The following examples are illustrative of methods for the preparation of the liquid compositions of this invention and their use in the production of fertilizers, but the invention is not limited to these examples or to the particular details described. The amounts of the various materials given in the examples are in parts by weight.

*Example I.*—An anhydrous composition may be made by admixing about 50 parts of dry ammonium chloride with about 50 parts of liquid anhydrous ammonia. This composition forms a liquid at temperatures above about 10° C., but if cooled to 4° C. for example, a thick slurry would be formed containing about 90 parts of undissolved $NH_4Cl.3NH_3$. About 11 parts of dry ammonium nitrate are mixed with about 100 parts of the foregoing ammonium chloride-ammonia composition to form a liquid which does not salt out at temperatures above about 4° C. This liquid contains about 0.41 part of nitrogen derived from ammonium chloride and ammonium nitrate for every one part of nitrogen in the form of free ammonia. At about 30° C. it has a vapor pressure of about 8 atmospheres absolute as compared with a vapor pressure of about 11.5 atmospheres absolute for liquid anhydrous ammonia at this temperature.

*Example II.*—The following materials are mixed:

(a) About 50 parts of a solution containing
About 30 parts of ammonium nitrate
10 parts of ammonia, and
10 parts of water;
(b) About 50 parts of a solution containing
About 16 parts of ammonium chloride
17 parts of ammonia, and
17 parts of water.

The liquid composition formed by mixing the foregoing two solutions does not salt out at temperatures above about 2° C. It contains about 0.66 part of nitrogen derived from ammonium chloride and ammonium nitrate for every one part of nitrogen in the form of free ammonia. At 30° C. the solution has a vapor pressure of about 1.3 atmospheres absolute as compared with a vapor pressure of about 3.6 atmospheres absolute for 50 per cent aqua ammonia at this temperature. It corresponds to a solution of about 30 parts of ammonium nitrate and 16 parts of ammonium chloride in about 54 parts of 50 per cent aqua ammonia (a solution of ammonia in water containing 50 per cent $NH_3$).

*Example III.*—A fertilizer mixture may be prepared by adding about 150 parts of the liquid composition described in Example II above to a mixture of the following ingredients:

About 890 parts of superphosphate (18% $P_2O_5$)
About 120 parts of ammonium sulphate
About 160 parts of muriate of potash (50% $K_2O$)
About 680 parts of an inert filler.

The resulting mixture is in good physical condition immediately after ammoniation and also after cooling to atmospheric temperature. It contains about 4 per cent nitrogen, 8 per cent $P_2O_5$, and 4 per cent $K_2O$.

*Example IV.*—About 42 parts of dry ammonium nitrate and 22.5 parts of dry ammonium chloride are dissolved in about 40 parts of liquid anhydrous ammonia. Such a solution will not salt out at temperatures above about 15° C. and at 30° C. it has a vapor pressure of about 3.8 atmospheres absolute as compared with a vapor pressure of about 11.5 atmospheres absolute for anhydrous liquid ammonia at this temperature.

About 105 parts of this solution are admixed with the following ingredients:

About 890 parts of superphosphate
About 125 parts of ammonium sulphate
About 160 parts of potassium sulphate
About 720 parts of inert filler.

The resulting mixture is in good physical condition immediately after preparation and also after cooling to atmospheric temperatures. It contains about 4 per cent nitrogen, 8 per cent $P_2O_5$, and 4 per cent $K_2O$.

*Example V.*—An anhydrous solution may be prepared by dissolving about 30 parts of solid ammonium nitrate and 28 parts of solid sodium nitrate in 42 parts of liquid anhydrous ammonia. The resulting solution does not salt out at temperatures above about 0° C. It contains approximately 49.7% nitrogen, in the proportions of about 0.43 part of nitrogen combined as ammonium nitrate and sodium nitrate for each part of nitrogen derived from free ammonia. At 30° C., for example, this solution has a vapor pressure of about 5.1 atmospheres gauge as compared with 10.5 atmospheres for anhydrous ammonia at this temperature.

*Example VI.*—An aqueous ammonium nitrate-sodium nitrate-ammonia-water composition may be prepared by admixing the following ingredients:

(a) 44 parts of an ammonium nitrate-water composition containing about 30 parts of ammonium nitrate and 14 parts water, such as might be obtained by evaporating the solution prepared by neutralizing aqueous nitric acid with aqua or gaseous ammonia.
(b) 30 parts of a sodium nitrate-water composition containing about 18 parts of sodium nitrate and 12 parts water, such as might be obtained by evaporating the solution formed by absorbing nitrogen oxides in a solution of sodium carbonate.
(c) 26 parts of anhydrous ammonia.

The solution which results does not salt out at temperatures above about 0° C. It contains approximately 34.9% nitrogen, in the proportions of about 0.63 part of nitrogen combined as ammonium nitrate and sodium nitrate for each part of nitrogen combined as derived from free ammonia. The composition is equivalent to about 30 parts of ammonium nitrate and 18 parts of sodium nitrate dissolved in 52 parts of 50% aqua ammonia. At 30° C., for example, the solution has a vapor pressure of about 1 atmosphere gauge, as compared with 2.6 atmospheres for 50% aqua ammonia at this temperature.

*Example VII.*—An anhydrous composition is prepared by dissolving about 27.3 parts of dry ammonium nitrate and 23.7 parts of dry sodium nitrate in 40 parts of anhydrous ammonia. This solution does not salt out at temperatures above about −15° C. It contains approximately 51% nitrogen. At 30° C., its vapor pressure is about 5.3 atmospheres gauge as compared with 10.5 atmospheres for liquid anhydrous ammonia.

91.0 parts of this solution are then utilized for the preparation of a complete fertilizer mixture by adding them in a suitable manner to a mixture containing about 890 parts of superphosphate (18% $P_2O_5$), 160 parts of muriate of potash (50% $K_2O$), 163 parts of sulphate of ammonia (21% N), and 696 parts of inert filler. The resulting mixture is in excellent physical condition.

It contains about 4% nitrogen (more than half of which was derived from the solution), 8% $P_2O_5$, and 4% $K_2O$. About one-tenth of the total nitrogen in the mixture is in the nitrate form.

*Example VIII.*—A solution having a composition approximately the same as that given in Example VI above, is prepared and is utilized for the production of a complete fertilizer mixture as follows: 154 parts of the solution are added in a suitable manner to a mixture containing about 890 parts of superphosphate (18% $P_2O_5$), 127 parts of sulphate of ammonia (21% nitrogen), 160 parts of sulphate of potash (50% $K_2O$), and 669 parts of sand. The resulting mixture is in very good condition. It contains about 4% nitrogen (about ⅔ of which was obtained from the solution), 8% $P_2O_5$ and 4% $K_2O$. Approximately 16% of the total nitrogen in the mixture is in the nitrate form.

If desired additional materials, such as calcium nitrate, ammonium sulphate, ammonium phosphate, urea, etc., or any two or more of these materials, which in themselves are valuable fertilizers, may be incorporated with the ammoniacal solutions of this invention before they are added to the phosphate material, or as in the case of Examples III, IV, VII and VIII above, these added materials may be incorporated with a phosphate material before or simultaneously with the treatment with the ammoniacal solution. In preparing the fertilizers of this invention, the several solid ingredients may, if desired, be introduced into a mixer and simultaneously admixed therein with the ammoniacal solution, which is preferably supplied as a spray to the materials while they are being admixed. Further, if desired, the superphosphate material may be ammoniated with the ammoniacal solution and this ammoniated material used as a fertilizer itself or it may be admixed with one or more additional fertilizer ingredients.

When in this specification and claims, reference is made to an aqua ammonia of a specified percentage composition, reference is had to a solution of ammonia in water containing the indicated percentage of ammonia. The phrase "saturated with solid components" at a given temperature, as used herein, refers to solutions of ammonium nitrate and another fertilizer salt such as ammonium chloride or sodium nitrate from which a solid material containing, for example ammonium chloride and/or ammonium nitrate or sodium nitrate and/or ammonium nitrate (any of which may be in the solid form in combination with other components of the solution, particularly the ammonia) separates out from the solution when it is cooled to a lower temperature.

We claim:

1. A process for producing a fertilizer which comprises treating a superphosphate material with a liquid composition containing ammonium nitrate, ammonium chloride, ammonia and water, said liquid having a composition corresponding to a solution of about 30 parts of ammonium nitrate and about 16 parts of ammonium chloride in about 54 parts of 50 per cent aqua ammonia, said solution being added to the superphosphate material in the proportions of about 150 parts of the solution to about 890 parts of superphosphate.

2. A process for producing a fertilizer which comprises treating a superphosphate material with a substantially anhydrous liquid containing about 42 parts of ammonium nitrate, 22.5 parts of ammonium chloride, and about 40 parts of ammonia, the solution being added to the superphosphate material in the proportions of about 105 parts of the solution to about 890 parts of superphosphate.

3. As a new composition of matter, a solution of ammonium nitrate and ammonium chloride in an ammoniacal liquid containing a substantial proportion of ammonia, said solution being substantially saturated with the aforementioned salts at a temperature between about $-30°$ C. and $30°$ C.

4. As a new composition of matter a solution of ammonium nitrate and ammonium chloride in an ammoniacal liquid containing a substantial proportion of ammonia, said solution containing an amount of ammonium chloride dissolved therein in excess of that forming a saturated solution in the ammoniacal liquid at a temperature between about $-30°$ C. and $30°$ C. in the absence of the ammonium nitrate.

5. As a new composition of matter a solution of ammonium chloride and of ammonium nitrate in an ammoniacal liquid containing substantial proportions of ammonia, said solution containing dissolved therein sufficient ammonium chloride substantially to saturate said ammoniacal liquid at a temperature between about $-30°$ C. and $30°$ C., and containing ammonium nitrate in amount sufficient to impart to the solution a ratio of combined nitrogen to free ammonia nitrogen substantially greater than that of a saturated solution of ammonium chloride in said ammoniacal liquid.

6. The process for the preparation for transportation of ammonia and a plurality of fertilizer salts which comprises dissolving ammonium nitrate and ammonium chloride in an ammoniacal liquid containing a substantial proportion of ammonia in amount sufficient to form a solution substantially saturated with the aforementioned salts at a temperature between about $-30°$ C. and $30°$ C.

7. The process for the preparation for transportation of ammonia and a plurality of fertilizer salts which comprises dissolving ammonium nitrate and ammonium chloride in an ammoniacal liquid containing a substantial proportion of ammonia, said ammonium chloride being dissolved in the ammoniacal liquid in amount sufficient to form a solution substantially saturated at a temperature between about $-30°$ C. and $30°$ C., and the ammonium nitrate being dissolved in the solution in amount sufficient to impart to the solution a ratio of combined nitrogen to free ammonia nitrogen substantially greater than that of a saturated solution of the said ammonium chloride in the ammoniacal liquid.

8. The process for producing a fertilizer which comprises treating a solid acidic fertilizer material with a solution of ammonium chloride and of ammonium nitrate in an ammoniacal liquid containing substantial proportions of ammonia, said solution containing dissolved therein sufficient ammonium chloride substantially to saturate said ammoniacal liquid at a temperature between about $-30°$ C. and $30°$ C., and containing ammonium nitrate in amount sufficient to impart to the solution a ratio of combined nitrogen to free ammonia nitrogen substantially greater than that of a saturated solution of ammonium chloride in said ammoniacal liquid.

9. A process for producing a fertilizer which comprises treating a superphosphate material with a solution of ammonium nitrate and ammonium chloride in an ammoniacal liquid containing a substantial proportion of ammonia, said solution being substantially saturated with the aforementioned salts at a temperature between about −30° C. and 30° C.

10. A process for producing a fertilizer which comprises treating a superphosphate material with a solution of ammonium nitrate and ammonium chloride in an ammoniacal liquid containing a substantial proportion of ammonia, said solution containing an amount of ammonium chloride dissolved therein in excess of that forming a saturated solution in the ammoniacal liquid at a temperature between about −30° C. and 30° C. in the absence of the ammonium nitrate.

11. A process for producing a fertilizer which comprises treating a superphosphate material with a solution of ammonium chloride and of ammonium nitrate in an ammoniacal liquid containing substantial proportions of ammonia, said solution containing dissolved therein sufficient ammonium chloride substantially to saturate said ammoniacal liquid at a temperature between about −30° C. and 30° C., and containing ammonium nitrate in amount sufficient to impart to the solution a ratio of combined nitrogen to free ammonia nitrogen substantially greater than that of a saturated solution of ammonium chloride in said ammoniacal liquid.

12. As a new composition of matter a liquid composition containing about 10% to 30% ammonium nitrate and ammonium chloride and liquid anhydrous ammonia in the proportions in which said ammonium nitrate, ammonium chloride and liquid anhydrous ammonia form a solution substantially saturated with the aforementioned salts at a temperature below about 11° C.

WALTER H. KNISKERN.
CHARLES K. LAWRENCE.